United States Patent
Knipfer et al.

(10) Patent No.: US 8,145,336 B2
(45) Date of Patent: Mar. 27, 2012

(54) REAL-TIME ASSEMBLY AND PART VALIDATION AND AUTO-DISPOSITION

(75) Inventors: Ivory W. Knipfer, Rochester, MN (US); Fraser A. Syme, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 12/186,463

(22) Filed: Aug. 5, 2008

(65) Prior Publication Data

US 2010/0036515 A1    Feb. 11, 2010

(51) Int. Cl.
*G05B 19/18* (2006.01)
*G06F 11/00* (2006.01)
*G06Q 10/00* (2006.01)

(52) U.S. Cl. .............................. 700/105; 714/2; 705/29

(58) Field of Classification Search .................. 700/105, 700/107, 110; 705/28, 29; 707/100; 714/2
See application file for complete search history.

(56) References Cited

U.S. PATENT DOCUMENTS

| | | | |
|---|---|---|---|
| 5,802,524 A * | 9/1998 | Flowers et al. ............... | 707/711 |
| 6,173,246 B1 | 1/2001 | Billups, III | |
| 7,136,793 B2 | 11/2006 | Simkins | |
| 7,610,112 B2 * | 10/2009 | Knipfer et al. ................ | 700/106 |
| 2003/0217309 A1 | 11/2003 | Lodrige | |
| 2007/0130029 A1 * | 6/2007 | Helmolt et al. ................. | 705/27 |
| 2008/0183723 A1 * | 7/2008 | Knipfer et al. ................ | 707/100 |

OTHER PUBLICATIONS

Erik Jan Marinissen, et al., "Creating Value Through Test", 2002.
Andreas Dengel, et al., "Human-Centered Interaction with Documents", 2006.

* cited by examiner

*Primary Examiner* — Kakali Chaki
*Assistant Examiner* — Sivalingam Sivanesan
(74) *Attorney, Agent, or Firm* — Marcia L. Doubet

(57) ABSTRACT

Real-time assembly and part validation (or "containment") and auto-disposition in a manufacturing environment. Validation and auto-disposition are performed in a real-time, proactive manner where the validation and auto-disposition processing are not coupled to the installation process. Validation problems or issues may therefore be identified and resolved before an assembly or part is needed for installation.

18 Claims, 9 Drawing Sheets

FIG. 5

500 Rework Disposition Strategy

| 505 Condition ID | 510 Assembly | 515 Stocking Location | 520 Vendor | 525 Date Range | 530 Failure Content Tag | 535 Boolean Operator | 540 Assembly Condition Tag | 545 Priority | 550 Actions |
|---|---|---|---|---|---|---|---|---|---|
| 000001 | 93X4485 | F2 | NONE | ALL | PROC, MEMORY | OR | DOWNLVL_FW | 10 | RMA |
| 000002 | 93X4485 | F2 | NONE | ALL | MEMORY | OR | DOWNLVL_FW | 20 | REWORK-F2 |
| 000003 | 93X4485 | F2 | NONE | ALL | PROC | AND | OLD_F2 | 30 | HOLD_EXTENDED_FA, EMAIL_QUALITY |
| 000099 | 71P0001 | ALL | CLS | ALL | NA | AND | MEMORY_CHK | 10 | MOVE_TO_RMA_LOC, RMA |
| 000100 | 71P0001 | ALL | CLS | ALL | BACKPLANE | AND | NA | 20 | HOLD FOR QUALITY |

600 Assembly Failure Content

| 610 Failure Content Tag | 620 Part Number |
|---|---|
| PROC | 11F1111 |
| MEMORY | SC000BY |
| BACKPLANE | 44B9876 |
| BACKPLANE | 55C5555 |

Dependent Assembly Conditions

| Assembly Condition Tag (710) | Asset Age (time since last as-built record) (720) | Assembly Conditions (730) | Operation Status (740) |
|---|---|---|---|
| OLD_F2 (701) | BUILT BEFORE 01/18/08 | | Passed Op 420 |
| MEMORY_CHK (702) | ALL | PN=55F9942, EC=9943043, QTY=2 | Passed Op 521 |
| DOWNLVL_FW (703) | | | Passed Op 521 |

FIG. 8
800

Rework Actions

| Condition ID (810) | Assembly Identification <WU, SN or how keyed> (820) | Action Priority (830) | Program to Call (840) | Date/Time Status (850) |
|---|---|---|---|---|
| 000099 (801) | WU00042445 | 1 | MOVE_TO_RMA_LOC | Complete: 01/30/08 10:12 am |
| 000099 (802) | WU00042445 | 2 | RMA | |

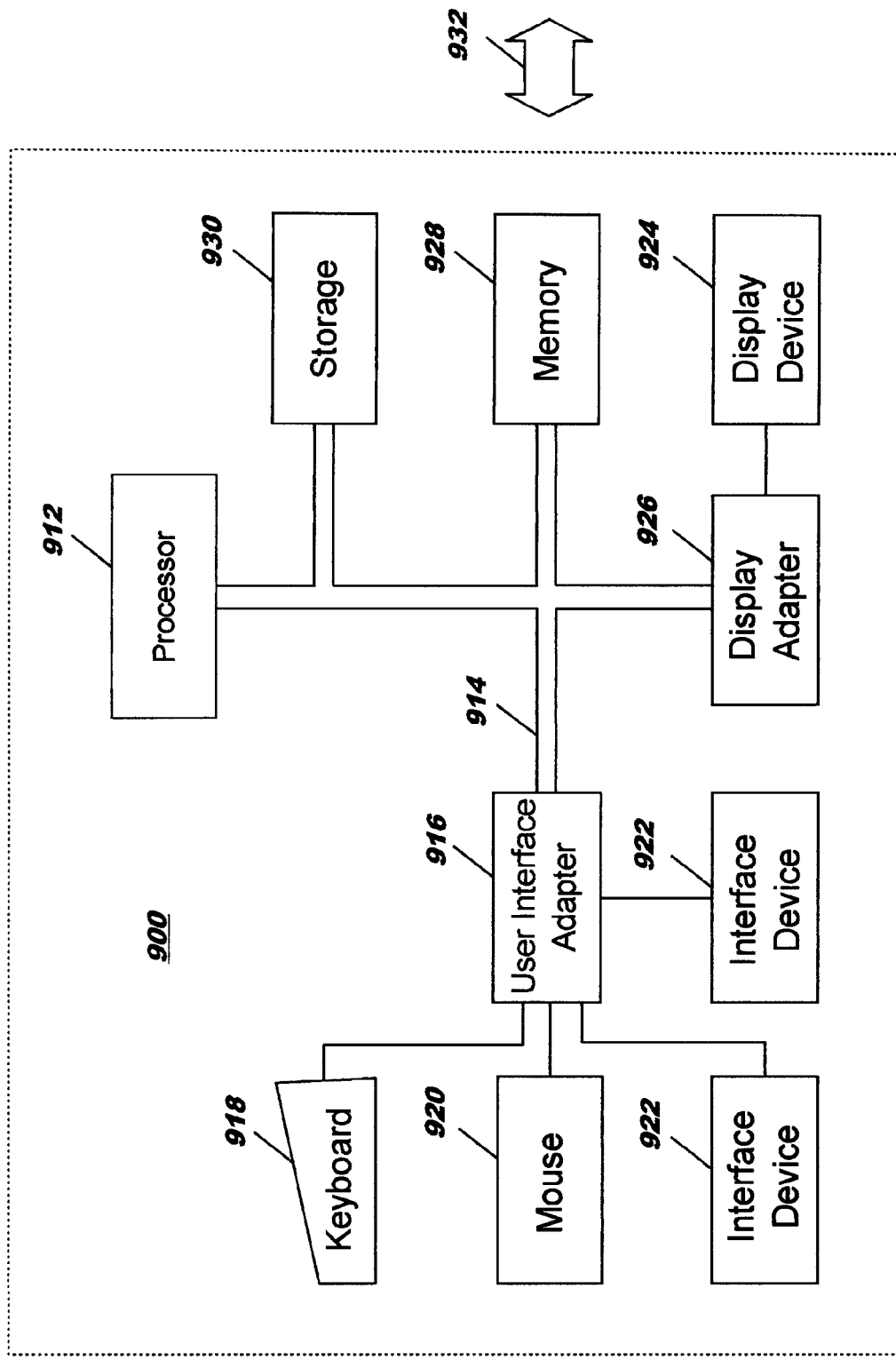

REAL-TIME ASSEMBLY AND PART VALIDATION AND AUTO-DISPOSITION

BACKGROUND OF THE INVENTION

The present invention relates to manufacturing environments, and deals more particularly with real-time part and assembly validation and auto-disposition in manufacturing environments.

The manufacturing of some products utilizes sub-products. These sub-products may be (for example) assemblies that are purchased from an external supplier. Or, instead of purchasing the sub-products, they may be manufactured in-house by the same enterprise that manufactures the products. After the sub-products are purchased or assembled, they are typically stocked in inventory prior to use in the final production of a product.

BRIEF SUMMARY OF THE INVENTION

The present invention is directed, in one aspect, to automated validation and auto-disposition of parts for use in assembling a product. In one embodiment, this comprises: validating whether each of a plurality of parts is acceptable for use in current production by comparing a version of each part to an acceptable version or versions of that part (e.g., to determine whether the version of the part is different from the acceptable version or versions of that part); and for each of at least one of the parts that fails the validation, programmatically consulting a rework repository to determine any rework actions specified therein for addressing the validation failure and initiating at least one specified rework action to address the validation failure.

In another aspect, the automated validation and auto-disposition pertain to assemblies that each comprise a plurality of parts. In yet another aspect, both parts and assemblies are validated, and at least one rework action is initiated for at least one of the failing parts and at least one of the failing assemblies.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIGS. 5-8 provide sample data for illustrating operation of an embodiment of the present invention;

FIG. 9 depicts a data processing system suitable for storing and/or executing program code.

DETAILED DESCRIPTION OF THE INVENTION

Figure 1:
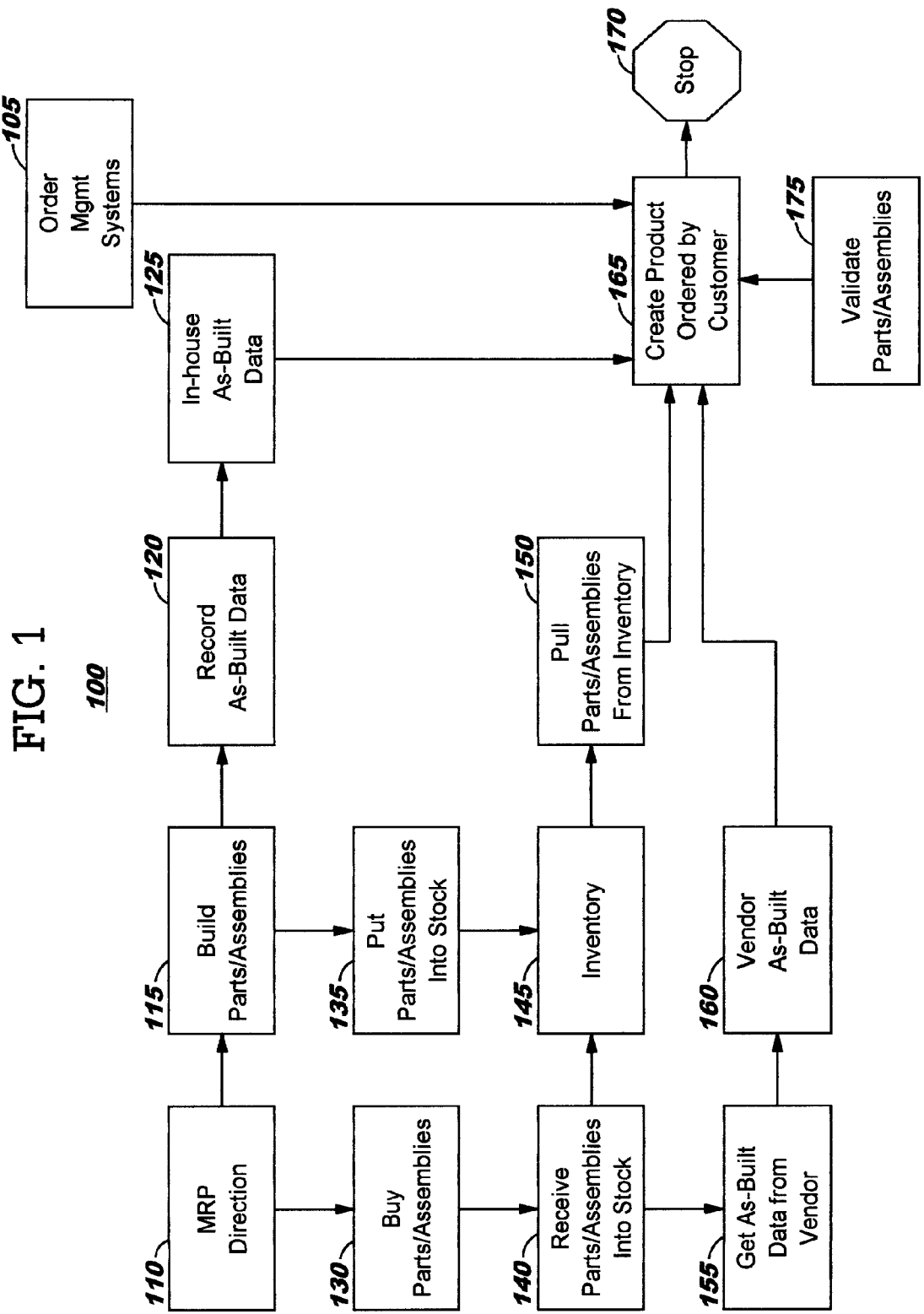
FIG. 1 illustrates a prior art automated validation, which is performed at the time of installation.

Embodiments of the present invention are directed toward real-time assembly and part validation (which may also be referred to as "containment") and auto-disposition in a manufacturing environment. Using techniques disclosed herein, validation and auto-disposition are performed in a real-time, proactive manner where the validation and auto-disposition processing are not coupled to the installation process. Validation problems or issues with an assembly or part may therefore be identified and resolved before the assembly or part is needed for installation.

A product may be comprised of a number of sub-products, which may alternatively be referred to simply as parts. A computer, for example, typically comprises various types of memory and storage hardware. In turn, the memory and/or storage hardware may be comprised of a number of smaller parts. A laptop computer may contain on the order of 30 to 40 parts, whereas a large computer server may contain on the order of 30,000 to 40,000 parts. The term "assembly" is used herein to refer to a collection of more than one part. The term "sub-product" is used herein to refer to a part or assembly that is integrated with other parts or assemblies to build a product.

When a product is being assembled from sub-products, it is common for a production facility to validate that the sub-products comply with a "current production practice" part list. This validation is typically performed at the time of installation of a particular sub-product into the product. For example, if a part number 1234 is to be used in assembling a product XYZ, the validation of part number 1234 is typically performed at the point in time when part number 1234 is to be added to the product under assembly, and typically comprises comparing a version number of part number 1234 against a list that specifies which versions of part number 1234 are currently acceptable for use in product XYZ. The current production practice part list may reflect, for example, that a certain version of a part or assembly has been found to be defective, obsolete, or otherwise unusable and therefore a different version (or versions) must be used. The list may be updated periodically, as other issues are found with various parts or assemblies, so that the list reflects the parts and assemblies which are deemed to be acceptable for use in current production.

Two existing approaches for validating sub-products are known to the present inventors, as will now be described.

In a first known approach, an automated validation is performed at the time of installation, using current production containment rules (e.g., acceptable parts and assemblies, as documented on a current production parts list), and comprises scanning a bar code of a part or assembly that is ready to be installed. The bar code contains information indicating the part number and serial number, and usually also indicates the version or manufacturing date of that particular part or assembly. If this install-time validation fails, then this part or assembly is rejected.

While this install-time validation approach may be successful in preventing a down-level or defective part or assembly from being included in a product, it also has drawbacks. As one drawback, this known approach causes delays in the production of the product, and may even cause complete stoppage, while a replacement for a rejected part or assembly is located or while a repair is performed on the rejected part or assembly as an attempt to bring it into conformity with the current production practice part list. As another drawback, unplanned cycle time is added to the manufacturing process while the repair is performed or while the replacement is located and substituted for the rejected part or assembly. As a further drawback, revenue losses may be experienced for the manufacturer due to the production delay or stoppage. In addition, inventory cost may be increased.

This first known approach is illustrated in FIG. 1; see, generally, reference number 100. As shown therein, an order management system 105 receives a customer order. The customer order typically identifies the product at a relatively high level, and a bill-of-materials ("BOM") may be generated by a material requirements planning ("MRP") system to identify the parts and assemblies that will be required for building the product ordered by the customer (often referred to as "exploding" the BOM). FIG. 1 depicts an MRP direction 110 (which may alternatively be referred to as procurement direction) that identifies the parts and assemblies on the BOM in terms of which ones are to be built internally 115 and which ones are to be purchased 130 from an external supplier. The internally-built parts and assemblies are put into stock when completed, as shown at 135, and the externally-supplied parts and assemblies are received into stock from the supplier, as shown at 140. In either case, the parts and assemblies then form a portion of the manufacturer's inventory 145.

When the parts and assemblies are built internally, "as-built" data is provided by the manufacturer and recorded in a repository, as shown at 120. Similarly, when parts and assemblies are built by an external supplier, that supplier creates as-built data and provides it to the manufacturer for recording in a repository, as shown at 155. This as-built data typically comprises an electronic transmission of information pertaining to the parts and assemblies, such as a part number that identifies a part type and a serial number that uniquely identifies a particular part of this type. A version number may be included as well. The term "engineering change level", or "EC level", is sometimes used to indicate a particular version, and the terms "EC level" and "version" are used interchangeably herein.

During production 165 of the product ordered by the customer, the as-built data is provided from its data repository (see 125 and 160) as the parts and assemblies are pulled from inventory (see 150) for inclusion in the product. This as-built data is used in the above-described install-time validation process to determine whether each particular part or assembly pulled from the inventory is acceptable for installation in the product. This validation is illustrated in FIG. 1 at 175. As has been discussed above, if the validation fails for a particular part or assembly (e.g., because a part is a back-level version), the production process may be delayed or even completely stopped for this product, as illustrated at 170.

Figure 2:
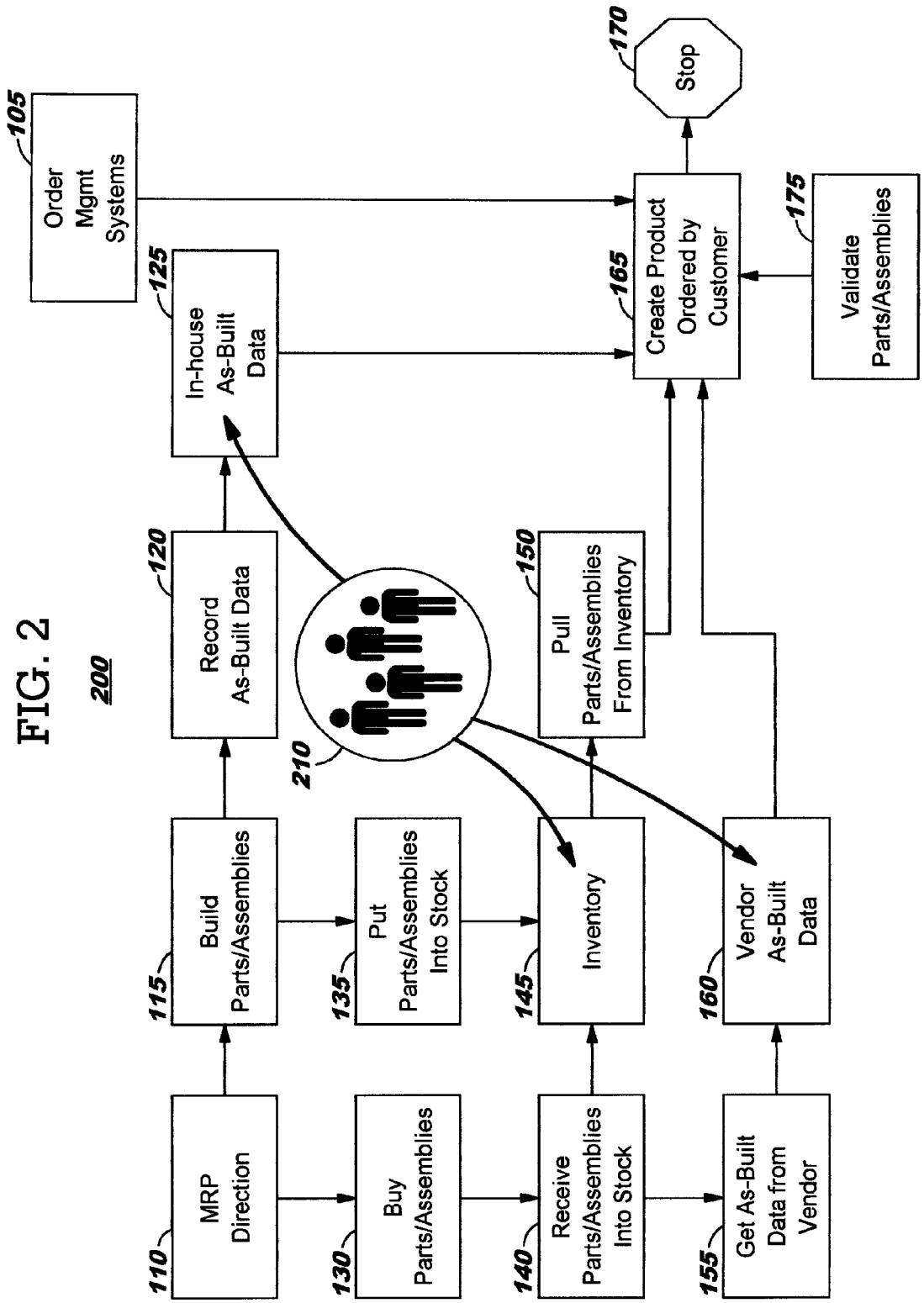
FIG. 2 illustrates a prior art manual validation.

In a second known approach, a manual analysis of parts and assemblies is performed. This second approach is illustrated in FIG. 2; see, generally, reference number 200. While the general process flow for a product and its parts and assemblies is similar to that of FIG. 1, the manual analysis approach dispatches workers 210 to search and analyze the inventory 145 and the repositories 125, 160 of as-built data to determine whether the parts and assemblies stored in inventory are acceptable for use in building customer-ordered products. If not, then the workers may isolate the unacceptable parts and assemblies.

The manual approach shown in FIG. 2 is frequently used in manufacturing environments and may be adequate for simple scenarios. However, this approach has a number of drawbacks. As one drawback, this approach is labor-intensive and expensive due to the lack of automation. As a further drawback, this approach does not scale well to complex scenarios such as a manufacturing environment involving many products and many sub-products. As yet another drawback, the validation itself may be relatively complex and difficult for the workers to perform, and this approach may therefore be error-prone. As a simple example of the validation that may be performed, it is common for the middle 3 digits of the bar code containing the serial number for the part to indicate a date of manufacture, and these digits may be tested during validation to ensure that a particular part has been manufactured within some specified date range. However, it may be difficult for the workers to accurately make this comparison with the bar code. As a result, it is believed by the present inventors that manufacturing environments using this manual approach rely heavily on a follow-up automated validation performed during the installation process, as has been depicted in FIG. 1 and as shown at 175 in FIG. 2, to catch problems which were not detected by the workers 210 in their manual approach. This leads to further expense and revenue loss for the manufacturer.

By contrast to the approaches illustrated in FIGS. 1 and 2, an embodiment of the present invention uses an automated real-time, iterative approach to validating parts and assemblies and disposing of detected issues, thereby proactively ensuring that a particular part or assembly will be acceptable for use in the production process when that part or assembly is subsequently needed. By isolating problematic parts and assemblies ahead of time, the auto-disposition ensures that necessary repairs or replacements can be addressed in advance, thereby avoiding subsequent delay to the production of a customer order. In addition, the disclosed techniques enable proactively identifying and rectifying multiple issues with a single part or assembly, which may comprise carrying out one or more specified actions that are associated with each issue, as will be described.

Figure 3:
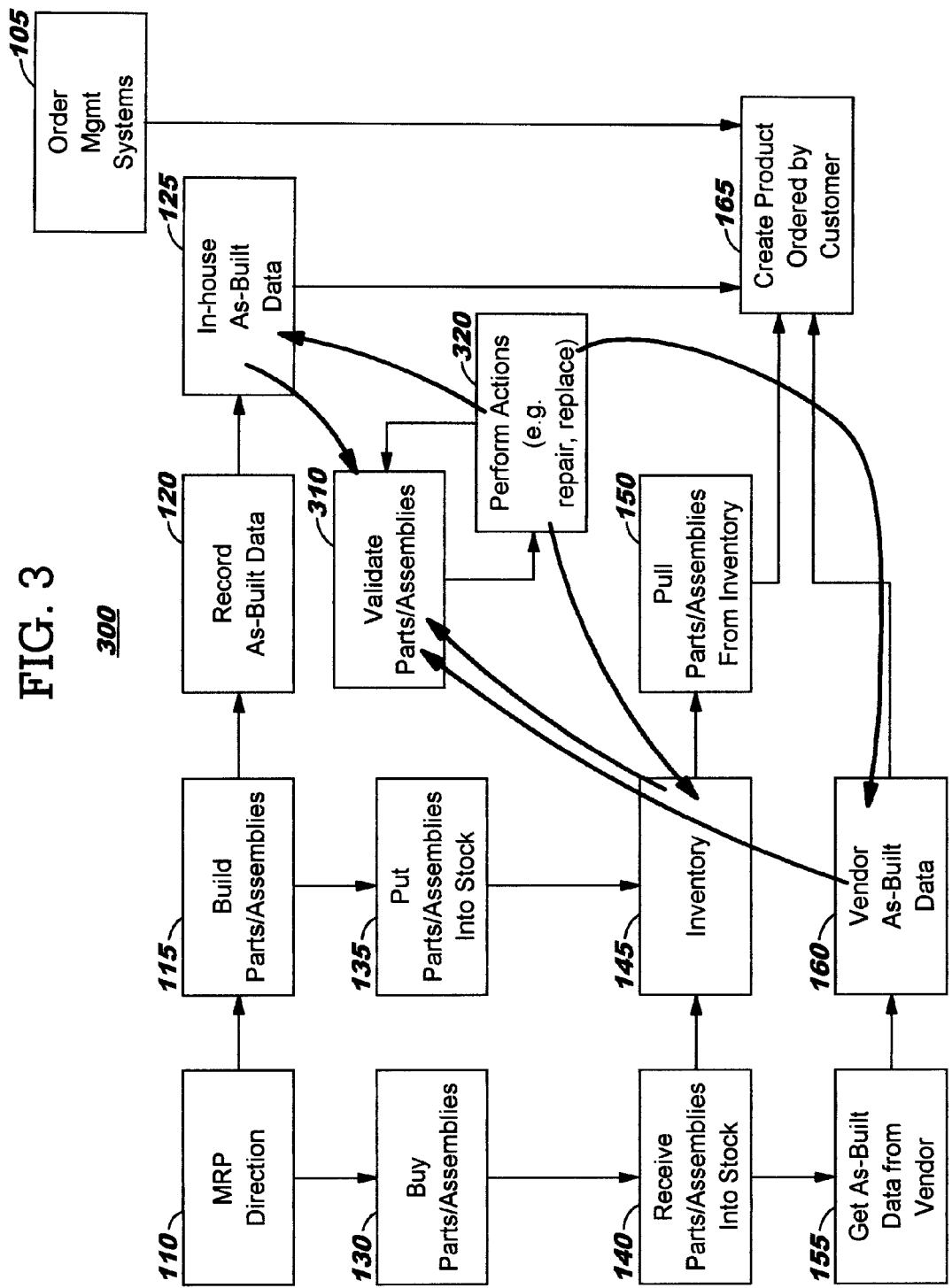
FIG. 3 illustrates an automated validation and auto-disposition according to an embodiment of the present invention, which is typically performed in advance of installation.

An embodiment of the approach disclosed herein is illustrated in FIG. 3; see, generally, reference number 300. In contrast to the approaches shown in FIGS. 1 and 2, the proactive approach in FIG. 3 performs validation 310 and auto-disposition actions 320 (preferably, in an iterative manner) without regard to whether a particular part or assembly is currently needed in production of a product. Input to the validation 310 is taken from as-built data repositories 125, 160 and inventory 145. Execution of the validation may be driven by events, such as reference to a part or assembly which then triggers a validation, receipt of new parts or assemblies into inventory, and so forth. As an alternative, execution of the validation may be timer-driven. Or, a combination of event-driven and timer-driven validation may be used without deviating from the scope of the present invention. (An embodiment of the validation and auto-disposition processing is described in more detail below, with reference to FIGS. 4-8.) As issues are detected during validation 310, the specified action or actions are performed (see 320). These actions may include, by way of example, repairing a defective part or assembly; discarding all obsolete versions of a part or assembly and replacing that inventory with a current version; returning a part or assembly to the vendor because of defects; and so forth. FIG. 3 therefore illustrates (potentially) updating as-built data 125, 160 and inventory 145 in response to the actions performed at 320 (e.g., as parts are removed from stock or returned to stock). The validation 310 may then be repeated (for example, at a subsequent time), following the performing of the action(s) at 320, and this repeated validation may uncover additional issues that can then be addressed by performing further action(s) at 320. (Although not shown in FIG. 3, a validation as performed at 175 of FIG. 1 may also be conducted during production 165 of the product ordered by the customer.)

Figure 4:
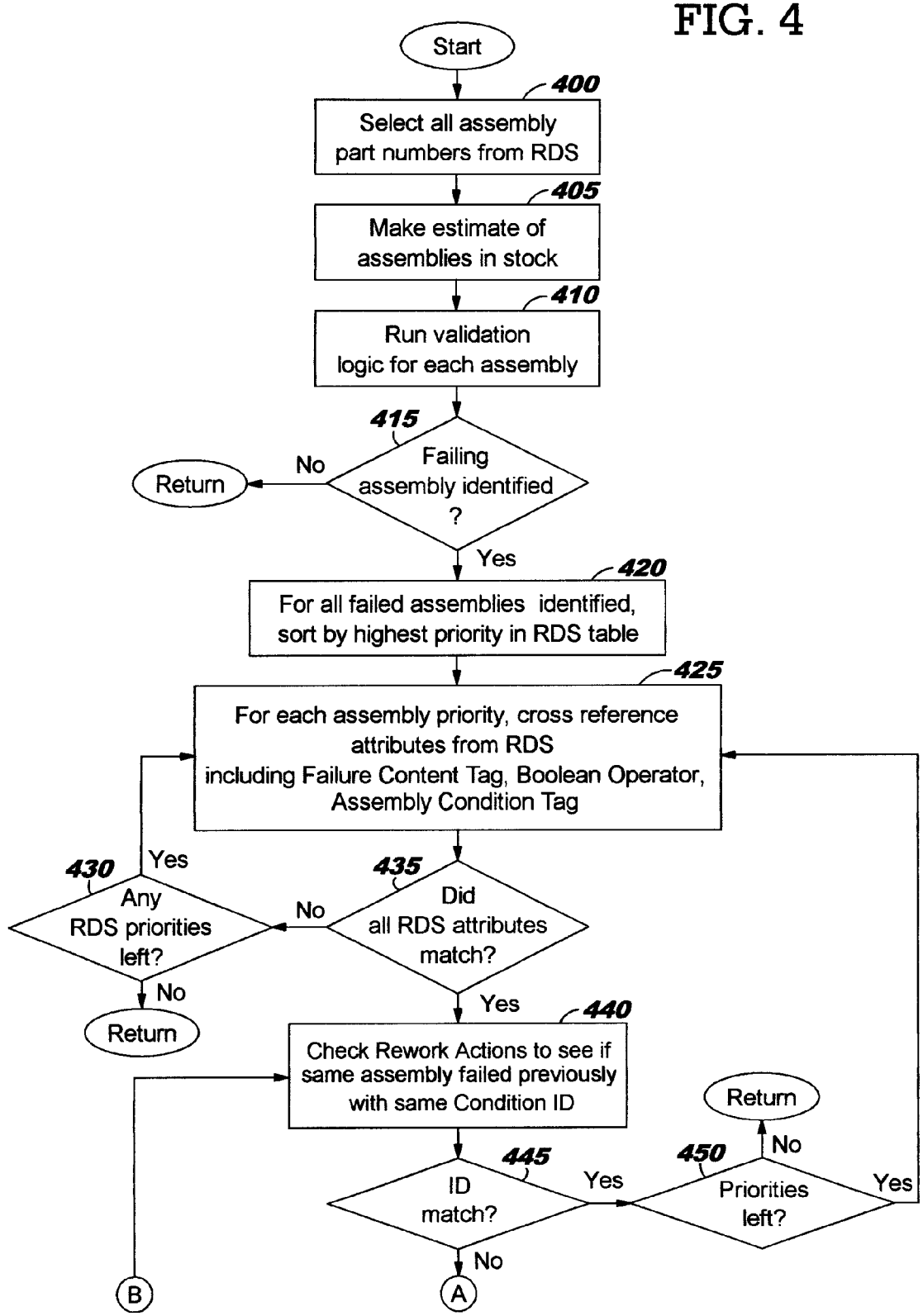
FIG. 4 provides a flowchart depicting logic which may be used when implementing an embodiment of the present invention.
Figure 4:
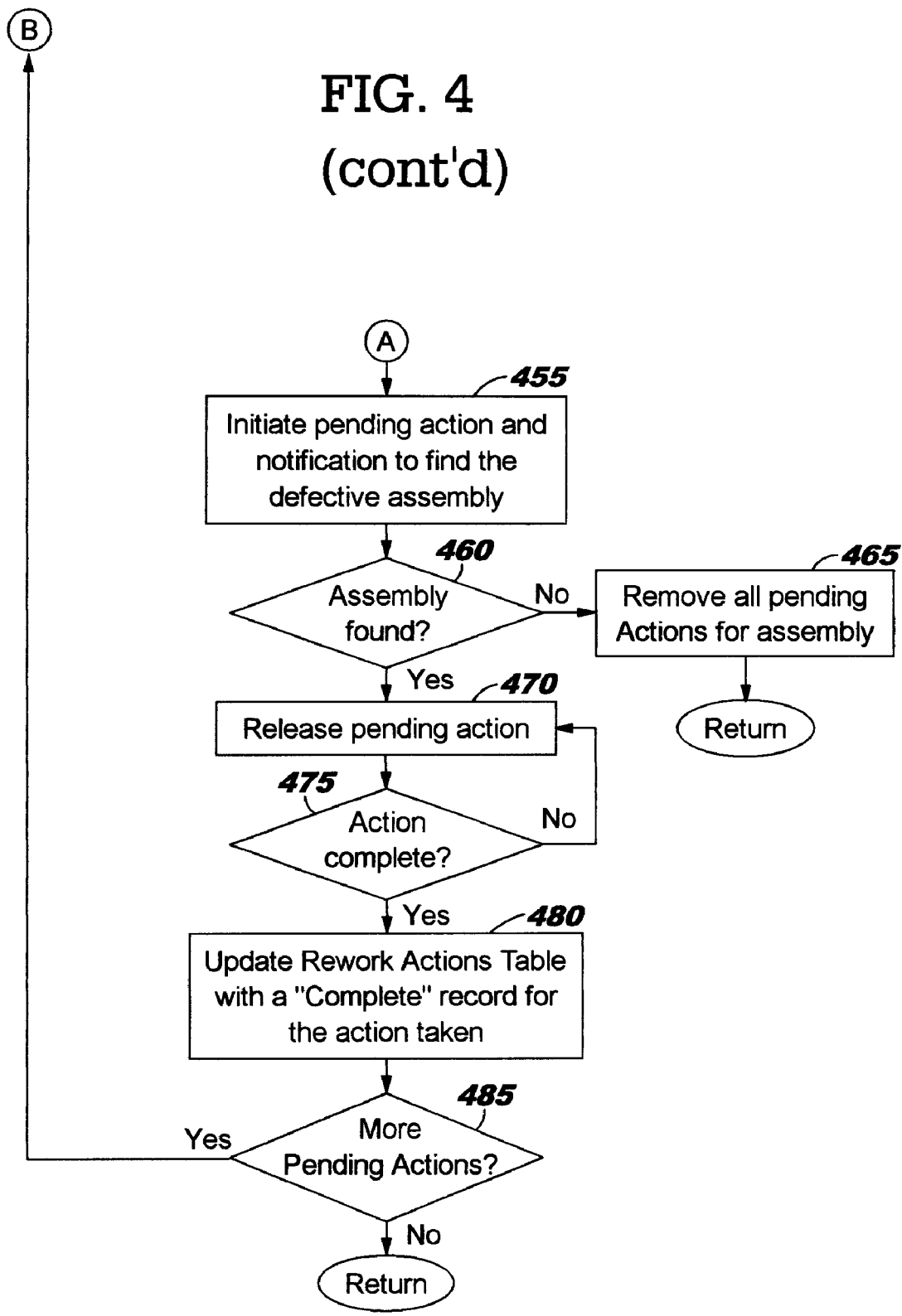

FIG. 4 provides a flowchart depicting logic that may be used when implementing an embodiment of the present invention. For ease of reference, FIG. 4 refers to processing that involves assemblies; however, this is by way of illustration only, and an embodiment that processes individual parts instead of, or in addition to, assemblies is also within the scope of the present invention. FIG. 4 refers to information stored in several data structures, examples of which are provided in FIGS. 5-8. While the data structures are illustrated therein using a tabular format, this is by way of illustration and not of limitation, and references herein to this tabular format are also by way of illustration only. Furthermore, the format and content shown in the sample data structures is by way of illustration and not of limitation: additional, fewer, or different data structures and data fields may be used without deviating from the scope of the present invention.

The processing of FIG. 4 may be triggered in various ways, as noted earlier, and begins at Block 400 by selecting all of the unique assembly part numbers from a data structure referred to herein as a "rework disposition strategy" or "RDS" file. These obtained numbers may represent assemblies as well as individual parts, although subsequent discussions of FIG. 4 are directed primarily toward assemblies. The records obtained from the RDS file will be processed by the subsequent logic in FIG. 4. A sample RDS file 500 is illustrated in FIG. 5, and will now be described.

A record is preferably created in RDS file 500 for each assembly or part that is to be searched for and processed during a validation, and for each set of conditions and each set of actions to be used during auto-disposition of issues. These records from RDS file 500 are used, in combination with related records in the tables illustrated in FIGS. 6-8, to coordinate the rework that is needed for an assembly that fails validation. For example, if an obsolete part is to be proactively removed from inventory, without regard to whether that part is currently requested for inclusion in a product, a record will be created in file 500 to specify information usable in detecting that obsolete part and removing it from inventory. Multiple rows may be created for a single part or assembly, as needed, if more than one set of conditions is to be used in validating that part or assembly. Information stored in the sample RDS file 500, along with related files 600 of FIG. 6 and 700 of FIG. 7, will now be described.

As shown in FIG. 5, the records in sample RDS file 500 comprise a condition identifier ("ID") 505; an assembly part number 510; a stocking location 515; a vendor identifier 520; a date range 525; a failure content tag 530; a Boolean operator 535; an assembly condition tag 540; a priority 545; and an actions field 550. These fields will now be described.

The condition ID 505 is a value that enables uniquely identifying a record in table 500, and may (for example) be generated as a sequentially-increasing number. The condition ID value 505 is also used to map to a row in a rework actions table 800 as illustrated in FIG. 8 (discussed below), thereby linking rows from table 500 to rows from table 800. Assembly part number 510 corresponds to the part number with which a particular assembly is identified. Combining the condition ID field 505 with assembly part number field 510 enables specifying more than one distinct row in table 500 for a particular assembly. Therefore, multiple sets of conditions may be specified for a particular assembly, and each of these sets of conditions may have a different priority. See, for example, rows 501, 502, 503 of table 500, which each represent the same assembly—namely, the assembly having part number "93X4485", in this example. The first of these rows has a priority "10", the second has a priority "20", and the third has a priority "30"; see the priority column 545. So, for example, the information specified in row 501 will be used in validation before the information specified in row 502 is used, because row 501 has a higher priority than row 502 (assuming that a lower priority number represents a higher priority, in this example).

A single action may be specified in a row of table 500, as illustrated by column 550 of row 501. On the other hand, multiple actions may be specified for a single row; see the actions column 550 of row 503, where a sample comma-separated list includes 2 different actions. In the sample data of column 550, the term "RMA" from row 501 is an acronym for "returned machine authorization", indicating that the assembly to which this row pertains should be returned to the vendor; the term "REWORK-F2" from row 502 indicates that the assembly to which this row pertains should be reworked in some manner. The particular entries specified in column 550 may vary widely, and the sample data is provided by way of illustration only.

Stocking location column 515, vendor column 520, and date range column 525 may be used as a way to narrow or restrict the set of parts or assemblies that is the subject of the validation and auto-disposition, according to information specified in a particular row of table 500. In this sample data, for example, row 501 indicates that the assemblies of interest are those having part number "93X4485" which are stored in stocking location "F2", and which were manufactured in-house (as indicated, in this sample data, by a vendor keyword of "NONE") during any date range (as indicated, in this sample data, by a date range keyword of "ALL"). Although not shown in this sample data, a validation process might be further restricted to a subset of the parts or assemblies by specifying a date range that corresponds to the date of manufacture. For example, suppose the validation attempts to locate all parts "ABC" which were manufactured in April of 2008 upon determining that a manufacturing defect is present in those parts, although this defect is not present in parts "ABC" manufactured at other times. A row can be created in table 500 that specifies "ABC" in column 510 and the April, 2008 date in column 525, with corresponding action (such as "destroy") specified in column 550. (One alternative technique for specifying a date restriction uses column 540 to map to the asset age column 720 of table 700, as discussed below.)

If it is desirable to perform different actions on different versions of a particular assembly or part number 510, this may be facilitated by creating multiple rows for that assembly part number, each row having a different value in the actions column 550.

The sample table 500 also contains columns 530-540 for specifying optional entries to further narrow or restrict the set of parts or assemblies that is the subject of the validation and auto-disposition, according to information specified in a particular row of table 500. Entries in column 530 are mapped, in the sample data structures, to entries in an assembly failure content table 600 (see FIG. 6) and entries in column 540 are mapped, in the sample data structures, to entries in a dependent assembly conditions content table 700 (see FIG. 7). Entries located in tables 600 and 700 are then used to further restrict the set of searched-for parts or assemblies to which a particular row of table 500 pertains.

Referring to row 501 by way of illustration, the failure content tag 530 specifies "PROC, MEMORY"; the Boolean operator 535 is "OR"; and the assembly condition tag 540 specifies "DOWNLVL_FW". Mapping the "PROC" value from the comma-separated list at 530 of row 501 into the failure content tag column 610 of FIG. 6 results in locating row 601 of table 600, thereby yielding the part number "11F1111" specified in row 601 as the value of the part number column 620. Similarly, mapping the "MEMORY" value from the comma-separated list at 530 of row 501 into the failure content tag column 610 of FIG. 6 results in locating row 602 of table 600, thereby yielding the part number "SC0OOBY" specified in row 602 as the value of the part number column 620. Mapping the "DOWNLVL_FW" value from 540 of row 501 into the assembly condition tag column 710 of FIG. 7 results in locating row 703 of table 700, thereby yielding (in this example) an operation status of "Passed Op 521" from the operation status column 740. Using the Boolean "OR" operator from column 535 of row 501 along with the mappings to tables 600 and 700 in this example indicates that the assemblies of interest not only must have assembly part number "93X4485" (see column 510 of FIG. 5) and be located at stocking location "F2" (see column 515) and be manufactured in-house (see column 520), but they must also:

1) contain part number "11F1111" (see column 620 of row 601) and part number "SC0OOBY" (see column 620 of row 602) before the action from column 550 of row 501 is deemed to be applicable to this assembly; or 2) meet the operation status "Passed Op 521" (see column 740 of row 703) before the action from column 550 of row 501 is deemed to be applicable to this assembly.

Use of the "AND" Boolean operator shown in column 535 of row 503 indicates that the conditions from both row 601 of table 600 and row 701 of table 700 must be met before the actions in column 550 of row 503 are deemed to be applicable.

Column 720 of table 700 may be used to specify an asset age as a constraint on a validation and auto-disposition. For example, the "OLD_F2" value in column 710 of row 701 maps to column 540 of row 503, thus indicating that the actions specified in column 550 of row 503 are only applied if—in addition to the part number "11F1111" being found in the assembly, according to the "PROC" value from column 530 of row 503 and its mapped-to information in column 620 of row 601—the assembly was "built before Jan. 18, 2008" as specified in column 720. The values in the asset age column refer, in the sample table 700, to the date of the last receipt of as-built records (although this is by way of illustration and not of limitation).

Column 730 of table 700 may be used to specify various assembly conditions as constraints on a validation. In the example comma-separated list shown in column 730 of row 702, the specified "PN=55F9942, EC=9943043, QTY=2" indicates that the part number ("PN") of "55F9942" must be found in the assembly, and that part number must have an engineering change level ("EC") of "9943043", and there must be a quantity of 2 of them ("QTY 2") installed in the assembly before the actions in the row from table 500 that maps to row 702 (i.e., row 504 of table 500) are deemed to be applicable.

The operation status column 740 may be used when it is desirable to indicate something about where this particular assembly must be in the production process.

Referring again to FIG. 4, Block 405 makes an estimate of the assemblies that are currently in stock. This may comprise consulting as-built data 125, as-built data 160, and/or inventory repository 145 of FIG. 3. If serial numbers are used for tracking assemblies and parts, then Block 405 may comprise determining the serial numbers of all assemblies and parts which are currently in inventory 145. If serial numbers are not used for tracking, then an embodiment of the present invention may use the following approach:

For those assemblies and parts which are built in-house, then all built and uninstalled assemblies and parts (as indicated by as-built data 125) are preferably used as the population thereof which is obtained at Block 405.

For those assemblies and parts which are built by an external supplier, then all uninstalled assemblies and parts from the external suppliers (as indicated by as-built data 160) are preferably used as the population thereof which is obtained at Block 405.

If externally-built assemblies and parts have arrived from the vendor prior to receiving the corresponding as-built data 160, then those parts and assemblies are preferably not included in the processing performed in FIG. 4 until such time as the as-built data 160 arrives.

Block 410 indicates that validation logic is then executed for each assembly that matches the part numbers retrieved at Block 400. Preferably, the validation logic performed at Block 410 comprises comparing date-related or versioning information specified on the current production practice part list to the versioning of the assemblies (which may be encoded on a bar code). This may comprise obtaining an EC level of the assembly and comparing it to an acceptable EC level or levels as specified on the current production practice part list. In another approach, the serial number of the assembly may be used in this comparison. For example, the serial number may be mapped to the EC level of the assembly (particularly if serial numbers are assigned sequentially) by determining whether the serial number is greater than a serial number range or ending serial number associated with back-level versions of the assembly. In a further approach, as noted above, a serial number bar code label on an assembly may contain several digits that indicate date-related information regarding the manufacturing of that assembly. In yet another approach, a supplier identifier may indicate date-related or versioning information—for example, if it is known that assembly "PQR" was purchased from a particular supplier only on or after a particular date, then this date may be used in a comparison. Versioning information for a particular assembly may be obtained in other ways without deviating from the scope of the present invention.

Block 415 tests whether the validation performed at Block 410 identified a failing assembly (or part, as applicable). If not, then this iteration of the processing in FIG. 4 exits. Otherwise, when the test at Block 415 has a positive result, processing continues at Block 420.

As noted above, in one approach, multiple rows may be contained in RDS file 500 for a particular assembly, and these rows may have differing priority values. Block 420 therefore sorts the rows for each of the failed assemblies (as identified at Block 410) by priority, with highest priority (within assembly) to occur first in the sort output. Blocks 425-485 then process the information in each of the rows from RDS table 500, in priority order.

Block 425 uses the failure content tag, Boolean operator, and assembly condition tag from columns 530-540 of the currently-processed row from table 500, and compares that information to a particular failing assembly. As discussed above, the failure content tag (column 530) is mapped to column 610 of table 600 to locate a part number 620, and the assembly condition tag (column 540) is mapped to column 710 of table 700 to locate one or more values from columns 720-740. The Boolean operator (column 535) then determines the relationship between the values returned from tables 600 and 700, according to standard Boolean logic.

Block 435 tests whether all of the returned values or attributes from tables 600 and 700 match corresponding attributes of a particular failed assembly. If not, then Block 430 tests whether there are any more rows of RDS table 500 that are applicable to this assembly (by testing, in the embodiment shown in FIG. 4, whether there are any further priorities to be evaluated). If the test at Block 430 has a negative result, then processing of this assembly is complete, and control returns from Block 430 (e.g., to begin evaluating another failed assembly at Block 425). Otherwise, when the test at Block 430 has a positive result, processing continues at Block 425 for further processing of the currently-evaluated failed assembly using another one of the rows from RDS table 500 (i.e., the row for this assembly that has the next-highest priority number, according to the embodiment shown in FIG. 4).

When the test at Block 435 has a positive result, then a row has been located in table 500 that is applicable to the currently-evaluated failed assembly. Accordingly, Block 440 checks the rework actions table 800 (see FIG. 8) to determine whether a row is contained therein that has a condition number value (column 810) matching the condition number (from column 505) of this row from RDS table 500.

If the test at Block 445 has a positive result, this indicates that an entry has already been made in rework actions table 800 for this row from table 500, and thus further processing of this row is not required. Control therefore transfers to Block 450, which checks to see if there are any more rows of RDS table 500 that are applicable to this assembly (by testing, in the embodiment shown in FIG. 4, whether there are any further priorities to be evaluated). If the test at Block 450 has a negative result, then processing of this assembly is complete, and control returns from Block 450 (e.g., to begin evaluating another failed assembly at Block 425). Otherwise, when the test at Block 450 has a positive result, processing continues at Block 425 for further processing of the currently-evaluated failed assembly using another one of the rows from RDS table 500.

If the test at Block 445 has a negative result, this indicates that an entry has not yet been made in rework actions table 800 for this row from table 500. Processing then continues at Block 455, which creates a row in table 800 to record information for the actions from the currently-evaluated row from table 500, and records therein an indication of a pending action. This pending action corresponds to an action from the actions list 550 of the currently-evaluated row from table 500. Referring by way of example to row 801 of table 800, this row 801 represents the "MOVE_TO_RMA_LOC" action that appears as the first action in the comma-separated list in column 550 of row 504; see column 840. See also column 810, where the condition identifier "000099" is entered in row 801, thereby linking this row to row 504 of table 500. Assembly identification column 820 contains, in this example, a work unit ("WU") identifier of "WU00042445"; this value illustrates a tracking number that is assigned to a group of assemblies for rework processing (or other routing as a group). An action priority value of "1" is assigned in column 830, and may be used to indicate that the rework action from row 801 is of high priority whereas the rework action in row 802, having an action priority value of "2", is of lower priority. An entry in the "program to call" column 840 indicates, in this example, the type of rework action that is to be performed for assemblies corresponding to this row (i.e., the assemblies that are linked to row 801 by the matching condition identifier of "000099" in column 505 of table 500). Column 850 provides a current status for this rework action, along with a date and time stamp corresponding to that status. When the row is initially created, column 850 may be left empty or initialized to a null value.

In addition to creating an entry in table 800, Block 455 preferably also generates a notification that is provided to workers, informing the workers that rework is needed for the assemblies corresponding to this row in table 800, and also informing them of the particular type of rework—i.e., the rework indicated in column 840. As one alternative, an automated process may be dispatched to handle this rework instead of notifying a worker. The process identified in column 840 may include updating inventory status (e.g., if parts are returned to the supplier or discarded as being defective) and/or as-built data repositories, as discussed above with regard to FIG. 3. When processing of the rework action progresses, the date/time status value in column 850 is preferably updated accordingly.

Block 455 further indicates that the notification of rework includes a notification to find the defective assembly. For example, the stocking location value from column 515 of the corresponding row in table 500 may be provided. Block 460 then tests whether the assembly was found. If not, processing continues at Block 465, which removes all of the pending actions for this assembly (i.e., all of the corresponding rows) from table 800, thereby avoiding repeated checking for the assembly. Processing of this defective assembly is then complete, and control then returns from Block 465 (e.g., to begin evaluating another failed assembly at Block 425). Otherwise, when the test at Block 460 has a positive result, processing continues at Block 470 for further processing of the currently-evaluated failed assembly.

Block 470 indicates that a pending action is released. For example, if a group of assemblies has been identified for moving to a return-to-vendor location (as indicated, in the sample data, by the action in column 840 of row 801), then that process may be started. Block 475 tests whether the action has completed. If not, then control returns to Block 470 (preferably, after a delay is interposed). When the action has completed, the test in Block 475 has a positive result, and processing continues at Block 480 where the rework actions table 800 is updated to show that this action is now complete (e.g., by updating the date/time status 850 to specify "Complete"). While a row exists in table 800, but is not yet marked as "Complete", this provides a way of tracking the pending actions which are still in progress.

Block 485 then asks whether there are any more pending actions from table 500 which have yet to be completed, according to the rework disposition status entries in table 800. If there are, processing continues at Block 440. Otherwise, processing exits from Block 485 (e.g., to begin evaluating another failed assembly at Block 425).

The processing of FIG. 4 may iterate a number of times, searching for failing assemblies and initiating rework. A prior art validation may be performed during install time, as illustrated in FIG. 1 (see 175); typically, validation errors will not be detected during that install-time validation because those errors have been proactively addressed using an embodiment of the present invention.

The real-time validation and auto-disposition disclosed herein enable examining additional factors, beyond an EC level, as has been described with regard to columns 530-540 of RDS file 500 as well as column 620 of assembly failure content table 600 and columns 720-740 of table 700. An alternative embodiment may use more, fewer, or different columns and tables. The disclosed techniques also enable detecting multiple issues with a single part or assembly and creating a controlled and automated disposition comprising one or more actions for reworking a single part or assembly. Production stoppages due to late detection of errors may be greatly reduced or even completely avoided when using an embodiment of the present invention. An embodiment of the present invention is extensible, allowing user-defined actions to be specified yet programmatically controlled, and may be connected to an existing containment system or inventory management system (such as the system illustrated in FIG. 1).

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Referring now to FIG. 9, a data processing system 900 suitable for storing and/or executing program code includes at least one processor 912 coupled directly or indirectly to memory elements through a system bus 914. The memory elements can include local memory 928 employed during actual execution of the program code, bulk storage 930, and cache memories (not shown) which provide temporary storage of at least some program code in order to reduce the number of times code must be retrieved from bulk storage during execution.

Input/output ("I/O") devices (including but not limited to keyboards 918, displays 924, pointing devices 920, other interface devices 922, etc.) can be coupled to the system either directly or through intervening I/O controllers or adapters (916, 926).

Network adapters may also be coupled to the system to enable the data processing system to become coupled to other data processing systems or remote printers or storage devices through intervening private or public networks (as shown generally at 932). Modems, cable modem attachments, wireless adapters, and Ethernet cards are just a few of the currently-available types of network adapters.

Figure 10:
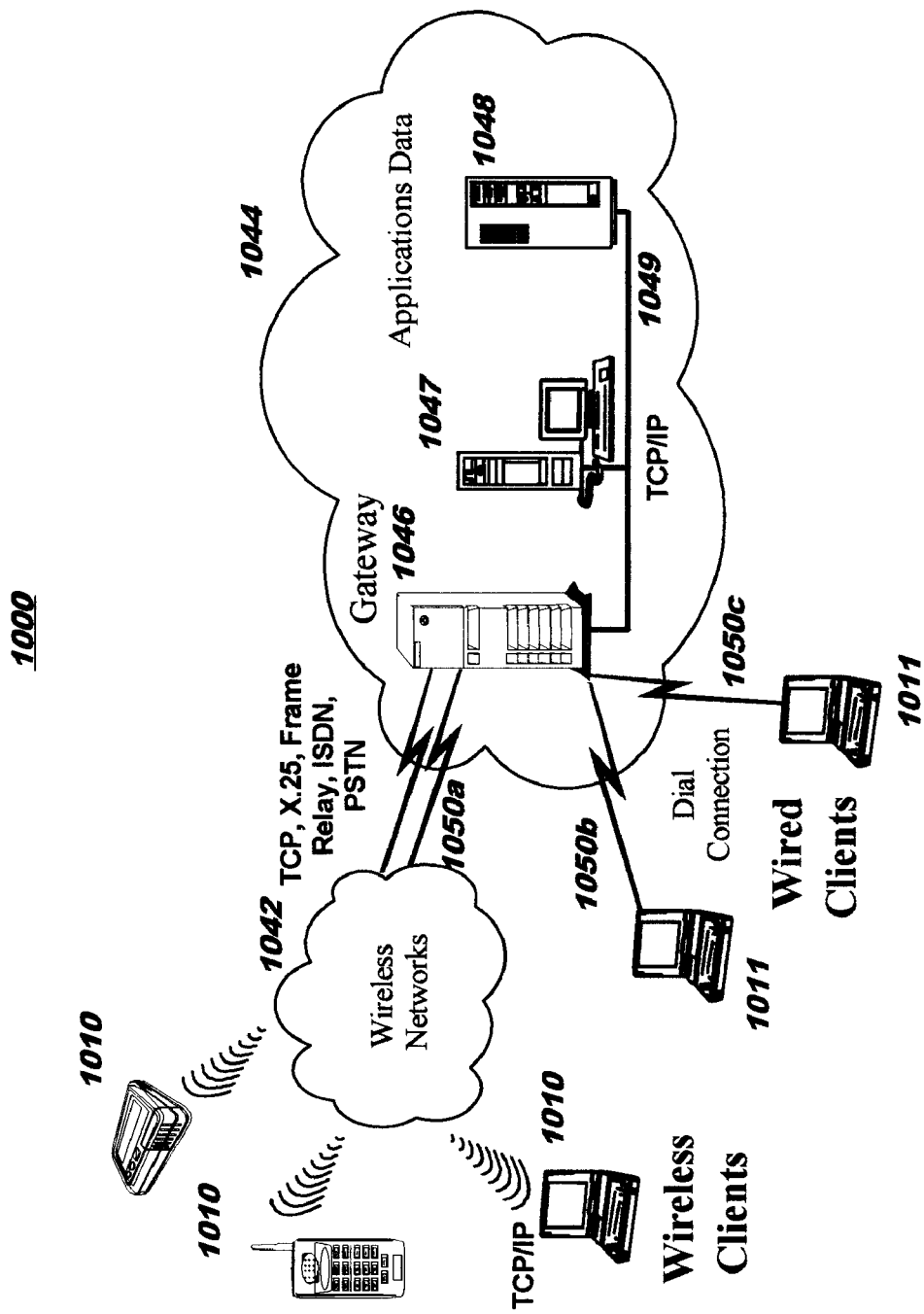
FIG. 10 depicts a representative networking environment in which one or more embodiments of the present invention may be used.

FIG. 10 illustrates a data processing network environment 1000 in which the present invention may be practiced. The data processing network 1000 may include a plurality of individual networks, such as wireless network 1042 and wired network 1044. A plurality of wireless devices 1010 may communicate over wireless network 1042, and a plurality of wired devices, shown in the figure (by way of illustration) as workstations 1011, may communicate over wired network 1044. Additionally, as those skilled in the art will appreciate, one or more local area networks ("LANs") may be included (not shown), where a LAN may comprise a plurality of devices coupled to a host processor.

Still referring to FIG. 10, the networks 1042 and 1044 may also include mainframe computers or servers, such as a gateway computer 1046 or application server 1047 (which may access a data repository 1048). A gateway computer 1046 serves as a point of entry into each network, such as network 1044. The gateway 1046 may be preferably coupled to another network 1042 by means of a communications link 1050a. The gateway 1046 may also be directly coupled to one or more workstations 1011 using a communications link 1050b, 1050c, and/or may be indirectly coupled to such devices. The gateway computer 1046 may be implemented utilizing an Enterprise Systems Architecture/390® computer available from IBM. Depending on the application, a midrange computer, such as an Application System/400® (also known as an AS/400®, iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 1046 may also be coupled 1049 to a storage device (such as data repository 1048).

Those skilled in the art will appreciate that the gateway computer 1046 may be located a great geographic distance from the network 1042, and similarly, the wireless devices 1010 and/or workstations 1011 may be located some distance from the networks 1042 and 1044, respectively. For example, the network 1042 may be located in California, while the gateway 1046 may be located in Texas, and one or more of the workstations 1011 may be located in Florida. The wireless devices 1010 may connect to the wireless network 1042 using a networking protocol such as the Transmission Control Protocol/Internet Protocol ("TCP/IP") over a number of alternative connection media, such as cellular phone, radio frequency networks, satellite networks, etc. The wireless network 1042 preferably connects to the gateway 1046 using a network connection 1050a such as TCP or User Datagram Protocol ("UDP") over IP, X.25, Frame Relay, Integrated Services Digital Network ("ISDN"), Public Switched Telephone Network ("PSTN"), etc. The workstations 1011 may connect directly to the gateway 1046 using dial connections 1050b or 1050c. Further, the wireless network 1042 and network 1044 may connect to one or more other networks (not shown), in an analogous manner to that depicted in FIG. 10.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. An automated validation and auto-disposition method for parts to be installed in one or more products, comprising:
   identifying each distinct part number represented in a rework repository;
   performing a validation for each part, from a plurality of parts, having a part number that matches any of the identified part numbers, further comprising:
      causing the part to fail the validation if a version number of the part does not match any of at least one predetermined acceptable version number for the part number; and
      causing the part to fail the validation if failure conditions specified for the matching identified part number in the rework repository match conditions corresponding to the part; and
   for each part that fails the validation, programmatically consulting the rework repository to determine any rework actions specified therein for addressing the validation failure and initiating at least one specified rework action to address the validation failure.

2. The method according to claim 1, wherein the automated validation and auto-disposition method is performed prior to needing parts for installation into a product.

3. The method according to claim 1, wherein the plurality of parts is determined by consulting an inventory repository.

4. The method according to claim 1, wherein the rework repository specifies, for each of at least one of the plurality of parts, at least one rework action.

5. The method according to claim 1, wherein the rework repository specifies, for each of at least one of the plurality of parts, a plurality of rework actions.

6. The method according to claim 1, wherein programmatically consulting a rework repository further comprises using the part number of each part that fails the validation as an index into the rework repository to locate rework actions specified therein in association with that part number.

7. The method according to claim 1, wherein the failure conditions comprise at least one of: a stocking location of the part, a vendor of the part, and a date range associated with the part.

8. The method according to claim 1, wherein the failure conditions comprise at least one of: a serial number of the part, an age of the part, and an operation status associated with the part.

9. The method according to claim 1, further comprising:
   validating whether each of a plurality of assemblies is acceptable for installing in the one or more products, comprising causing the assembly to fail the assembly validation if a version number of the assembly does not match any of at least one predetermined acceptable version number for the assembly, each assembly comprising at least two of the plurality of parts; and
   for each of at least one of the assemblies that fails the assembly validation, programmatically consulting the rework repository to determine any rework actions specified therein for addressing the assembly validation failure and initiating at least one specified rework action to address the assembly validation failure.

10. The method according to claim 1, further comprising creating a rework tracking entry in a rework actions repository for each of the initiated rework actions and recording, in the rework tracking entry, a current status of that initiated rework action.

11. The method according to claim 1, wherein the rework actions specified in the rework repository comprise at least one of: returning the part to a vendor thereof; repairing the part; and discarding the part.

12. A system for automated validation and auto-disposition of parts and assemblies for installation in a product, comprising:
   a computer comprising a processor; and
   instructions executable using the processor to implement functions comprising:
      identifying each distinct part number and each distinct assembly number represented in a rework repository;
      performing a part validation for each part, from a plurality of parts, having a part number that matches any of the identified part numbers and an assembly validation for each assembly, from a plurality of assemblies, having an assembly number that matches any of the identified assembly numbers, comprising causing the part to fail the part validation if a version number of the part does not match any of at least one predetermined acceptable version number for the part and causing the assembly to fail the assembly validation if a version number of the assembly does not match any of at least one predetermined acceptable version number for the assembly; and
      for each part that fails the part validation and each assembly that fails the assembly validation, using the part number of the failing part or the assembly number of the failing assembly, respectively, as an index to programmatically consult the rework repository to determine any rework actions specified therein, in association with the part number or the assembly number, for addressing the part or assembly validation failure and initiating at least one specified rework action to address the part or assembly validation failure.

13. The system according to claim 12, wherein:
   the automated validation and auto-disposition is performed prior to needing parts or assemblies for installation into a product.

14. The system according to claim 12, wherein the rework repository further comprises constraints for restricting whether the rework actions specified for a particular part number or assembly number are to be applied to individual parts or assemblies having that part number or assembly number, the constraints comprising at least one of: a stocking location of the part or assembly, a vendor of the part or assembly, and a date range associated with the part or assembly.

15. The system according to claim 12, wherein the rework repository further comprises constraints for restricting whether the rework actions specified for a particular part number or assembly number are to be applied to individual parts or assemblies having that part number or assembly number, the constraints comprising at least one of: a serial number of the part or assembly, an age of the part or assembly, and an operation status associated with the part or assembly.

16. A computer program product for automated validation and auto-disposition of parts and assemblies for installation in a product, the computer program product embodied on at least one computer-readable medium and comprising computer-readable program code for:
  identifying each distinct part number and each distinct assembly number represented in a rework repository;
  performing a part validation for each part, from a plurality of parts, having a part number that matches any of the identified part numbers and an assembly validation for each assembly, from a plurality of assemblies, having an assembly number that matches any of the identified assembly numbers, comprising causing the part to fail the part validation if a version number of the part does not match any of at least one predetermined number for the part and causing the assembly to fail the assembly validation if a version number of the assembly does not match any of at least one predetermined acceptable version number for the assembly; and
  addressing the validation failure for each part that fails the part validation and each assembly that fails the assembly validation by using the part number of the failing part or the assembly number of the failing assembly, respectively, as an index to programmatically consult the rework repository to determine any rework actions specified therein, in association with the part number or the assembly number, and initiating at least one specified rework action to address the part or assembly validation failure.

17. The computer program product according to claim 16, wherein the rework repository further comprises constraints for restricting whether the rework actions specified for a particular part number or assembly number are to be applied to individual parts or assemblies having that part number or assembly number, the constraints comprising at least one of: a stocking location of the part or assembly, a vendor of the part or assembly, and a date range associated with the part or assembly.

18. The computer program product according to claim 16, wherein the rework repository further comprises constraints for restricting whether the rework actions specified for a particular part number or assembly number are to be applied to individual parts or assemblies having that part number or assembly number, the constraints comprising at least one of: a serial number of the part or assembly, an age of the part or assembly, and an operation status associated with the part or assembly.

* * * * *